Dec. 29, 1925.
H. R. MILLER ET AL
1,567,379
SIGNAL DEVICE FOR MOTOR VEHICLES
Filed August 1, 1925    2 Sheets-Sheet 1
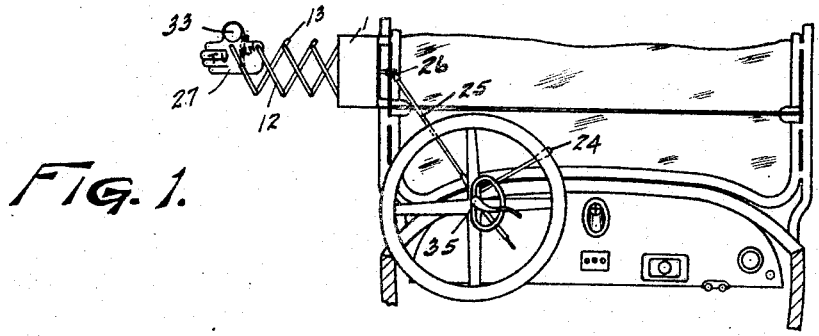
FIG. 1.
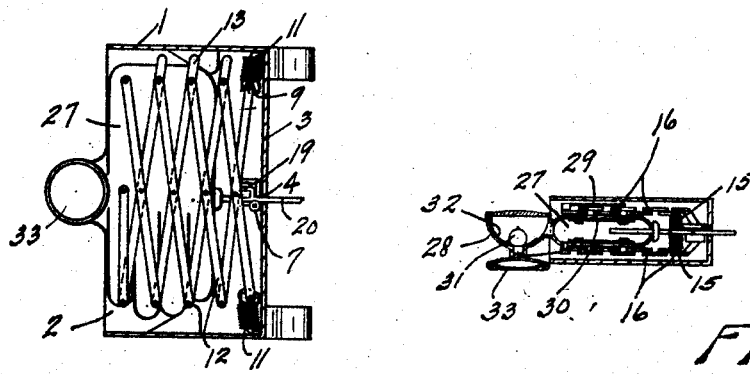
FIG. 2.
FIG. 3.
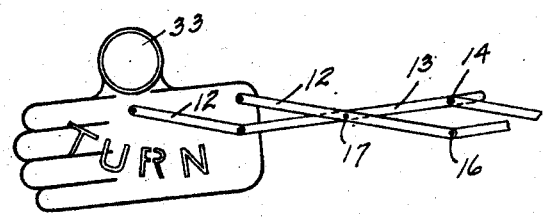
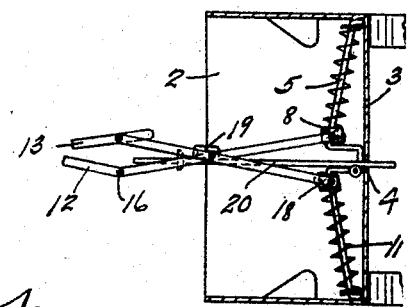
FIG. 4.
Inventor
Clifford M. Torgerson.
Hans R. Miller.
By Adam E. Fisher.
Attorney Dec. 29, 1925.   H. R. MILLER ET AL   1,567,379
SIGNAL DEVICE FOR MOTOR VEHICLES
Filed August 1, 1925   2 Sheets-Sheet 2

Inventor
Clifford M. Ingerson.
Hans R. Miller.
By Adam E. Fisher.
Attorney

Patented Dec. 29, 1925.

1,567,379

UNITED STATES PATENT OFFICE.

HANS R. MILLER AND CLIFFORD M. TORGERSON, OF FERGUS FALLS, MINNESOTA.

SIGNAL DEVICE FOR MOTOR VEHICLES.

Application filed August 1, 1925. Serial No. 47,596.

*To all whom it may concern:*

Be it known that HANS R. MILLER and CLIFFORD M. TORGERSON, both citizens of the United States, residing at Fergus Falls, in the county of Otter Tail and State of Minnesota, have invented certain new and useful Improvements in Signal Devices for Motor Vehicles, of which the following is a specification.

This invention relates to signal devices for motor vehicles and has as its special object the provision of such a signal which will eliminate the necessity of signaling with the hand when desiring to make a turn.

Another object is to provide a device which can be readily attached to any motor vehicle or built into the same as part of its regular equipment.

Another object is to provide a neat and attractive signal device which is positive in its action and which will permit the use of both hands in critical places.

A further object is to provide in a novel manner a simple and practical device which serves the purpose of a spotlight when not signaling, but which when signaling is completely hidden, thereby revealing only the given signal.

Other objects will be apparent from the accompanying drawing and specification.

In the drawing—

Figure 1 is a rear view of the signal device as mounted on a machine and giving a signal; the machine being only partly shown.

Figure 2 is a rear elevation of the signal device when closed, the rear side of the housing being removed to show the method of folding.

Figure 3 is a rear elevation of the signal device when extended, the rear side of the housing being removed to show the working elements of the device.

Figure 4 is an enlarged horizontal section of the folded signal device.

Figure 5:
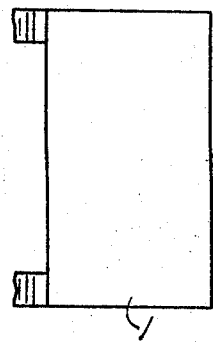
Figure 5 is a front elevation of the signal device when extended, showing the spotlight covered.
Figure 5:
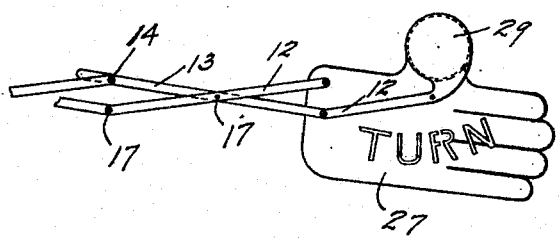
Figure 6:
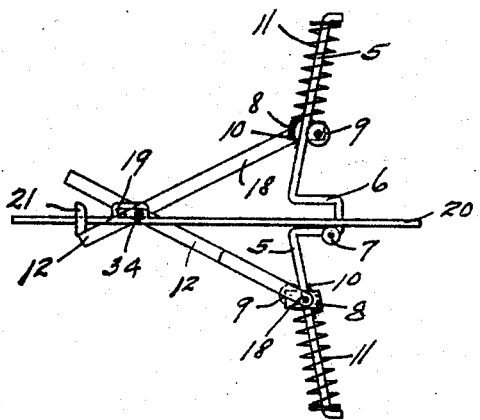
Figure 6 is an enlarged detail of the working elements located inside the housing.
Figure 7:
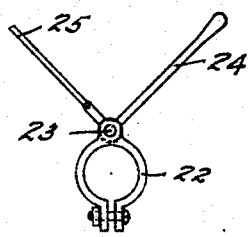
Figure 7 is an enlarged detail of the lever arrangement.

In carrying out this invention we provide a housing or case 1 made of any suitable sheet metal, and having its one side open as shown at 2, and having the opposite side 3 pierced with an aperture 4. A track 5 having its center bent into the form of a U as shown at 6 is rigidly secured to the side 3 and has mounted upon its approximate center a guide wheel 7 which is adapted to be engaged by a connecting rod 25. Mounted upon the track 5 by means of straps 8 are truckles 9 which are kept in constant engagement with the said track 5 thru flat springs 10 that are secured to the straps 8. Coil springs 11 are also mounted over the track 5 and are adapted to move the truckles 9 along the said track 5 when expanding. Collapsible straight extension bars comprising straight bars 12 and U shaped extension bars 13 have their upper ends pivoted together as shown at 14, and their center and lower ends spaced and pivoted as shown at 17 by means of springs 15 and bolts 16. The inner ends 18 of the extension bars 12 are pivotally secured to the straps 8 of the truckles 9. A buckle 19 has a rod 20 having a rubber covered stop 21 incorporated therein, extending therefrom, and is adapted to slidingly engage one of the center springs 15 and pivot bolts 16 as shown at 34. A bearing 22 which is adapted to be clamped or otherwise secured to the steering post 35 has a shaft 23 carrying an operating lever 24 journaled therein. A connecting rod 25 having a universal joint 26 provided therein, is pivotally secured to the rod 20 and to the connecting rod 25. A metal signal case 27 which is preferably made in the form of a hand and which is provided with a spotlight case 28, is pivotally secured to the outer extremities of the extension bars 12 and 13 and one of the bars 12. The outer extremity of one extension bar 12 has a metal disc 29 secured thereto, which said disc is adapted to pass in front of the spotlight when giving a signal. The said signal case 27 has the word "Turn" cut in its front and rear faces, and glass plates 30 placed against the inner sides of the said faces, so that when a light is placed within the said signal case 27, the letters will be distinctly illuminated. A light bulb 31 is mounted within the spotlight case 28 and connected to the regular light circuit. Reflectors 32 are mounted in the spotlight case 28, one above the light bulb 31 to throw the light down, the other in back of the light bulb 31 to throw the light out, so as to serve as a spotlight. A convex mirror 33 is secured to the rear side of the spotlight case 28 to permit the driver to see any objects which may be coming in the rear. Cushion stops are provided for the signal case 27 as shown in Figure 2.

In order to operate the device the driver raises the operating lever 24, thereby causing the connecting rod 25 to slide in the buckle 19 forward until the stop 21 of the pin 20 engages the signal case 27 and pushes it out a little, whereupon the coil springs 11 come into play causing the truckles 9 carrying the extension bars 12 and 13 to travel toward the U shaped center 6 of the track 5, thereby compressing the inner ends of the said extension bars 12 and 13, and expanding them in order to extend to signal case 27, so as to give notice of his intention. When extending the signal case 27 the disc 29 moves in front of the spotlight in order to permit oncoming vehicles or pedestrians to interpret the intentions of the driver. In order to withdraw the signal case 27, the operating lever 24 is turned down until the signal case has been withdrawn thru the connecting rod 25 and the buckle 19 which engages the spring 15 and bolt 16 shown at 34. When the signal case is withdrawn the disc 29 is also withdrawn from the face of the spotlight.

While we have herein described a certain specific method of constructing and assembling the elements of our invention, it is understood same may be varied in minor details, not departing from the spirit of our invention as defined in the appended claims.

We claim:

1. In a signal device as described, embodying the combination of a case for securing to the windshield; a track mounted in said case; spring set truckles engaging said track; coil springs on said track engaging said truckles; spaced pivoted extension bars secured to said truckles; a buckle engaging said spaced pivoted extension bars; an operating lever on the steering post; a connecting rod for said buckle and operating lever; a signal case, the faces pierced with the word "Turn" at the outer extremities of said extension bars; and a light for said signal case energized by the regular light circuit.

2. In a signal device as described, embodying the combination of a case for securing to the windshield; a track mounted in said case; spring set truckles engaging said track; coil springs on said track engaging said truckles; spaced pivoted extension bars secured to said truckles; a buckle engaging said spaced pivoted extension bars; an operating lever on the steering post; a connecting rod for said buckle and operating lever; a signal case, the faces pierced with the word "Turn" at the outer extremities of said extension bars; a spotlight case for said signal case; a convex mirror for said spotlight case; reflectors disposed at right angles to each other for said spotlight case; a light bulb energized by the regular light circuit for said spotlight; concaved reflectors disposed above and in back of said light bulb in said spotlight case; and a disc on said extension bars for covering said spotlight while signalling.

In testimony whereof we affix our signatures.

HANS R. MILLER.
CLIFFORD M. TORGERSON.